(12) United States Patent
Yip et al.

(10) Patent No.: US 7,673,057 B1
(45) Date of Patent: Mar. 2, 2010

(54) HYBRID CONNECTION ADMISSION CONTROL USING COMBINED MODEL-BASED AND MEASUREMENT-BASED ESTIMATORS

(75) Inventors: Man Pak Yip, Sunnyvale, CA (US); Madhav V. Marathe, Cupertino, CA (US); David Anthony Hughes, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 891 days.

(21) Appl. No.: 09/496,990

(22) Filed: Feb. 2, 2000

(51) Int. Cl.
*G04B 19/06* (2006.01)
*G06F 15/16* (2006.01)
*G06F 15/173* (2006.01)

(52) U.S. Cl. .................. 709/229; 709/226; 709/235; 370/232; 370/233

(58) Field of Classification Search ............. 370/230, 370/252, 232, 233, 234, 235, 229, 231, 389, 370/395, 468; 709/225, 223, 226, 231, 232, 709/235
See application file for complete search history.

(56) References Cited

U.S. PATENT DOCUMENTS

| | | | |
|---|---|---|---|
| 5,153,877 A | | 10/1992 | Esaki et al. |
| 5,341,366 A | * | 8/1994 | Soumiya et al. ............ 370/233 |
| 5,359,593 A | * | 10/1994 | Derby et al. ............... 370/234 |
| 5,764,626 A | | 6/1998 | VanDervort |
| 5,815,492 A | * | 9/1998 | Berthaud et al. ........... 370/234 |
| 5,872,771 A | * | 2/1999 | Park et al. .................. 370/252 |
| 5,881,049 A | * | 3/1999 | Beshai et al. ............... 370/234 |
| 5,917,804 A | * | 6/1999 | Shah et al. .................. 370/229 |
| 6,028,840 A | * | 2/2000 | Worster ...................... 370/230 |
| 6,041,039 A | * | 3/2000 | Kilkki et al. ................ 370/230 |
| 6,167,030 A | * | 12/2000 | Kilkki et al. ................ 370/236 |
| 6,222,824 B1 | * | 4/2001 | Marin et al. ................ 370/230 |
| 6,490,249 B1 | * | 12/2002 | Aboul-Magd et al. ....... 370/232 |
| 6,608,815 B1 | * | 8/2003 | Huang et al. ................ 370/232 |
| 6,625,155 B1 | * | 9/2003 | Dziong .................... 370/395.2 |
| 2002/0057649 A1 | * | 5/2002 | Kinnunen .................. 370/230 |

FOREIGN PATENT DOCUMENTS

WO     WO 9965194 A1  *  12/1999

OTHER PUBLICATIONS

Saltouros, Marios P., et al, A Scalable QoS-Based Routing Scheme for ATM Networks Using Reinforcement Learning Algorithms, University of Athens, Athens, Greece, 1999.*

* cited by examiner

*Primary Examiner*—Kevin Bates
(74) *Attorney, Agent, or Firm*—Schwegman, Lundberg & Woessner, P.A.

(57) ABSTRACT

A method and apparatus are described for controlling connection admission for a connection request in a network. A first estimator estimates an equivalent cell rate (ECR) based on description of the connection request. The description includes a booking factor. A second estimator estimates a measured utilization factor for admitted connections in the network using measurements of data streams arriving at queues. A controller is coupled to the first and second estimators to generate an admission decision for the connection request based on the estimated ECR and the estimated measured utilization factor.

60 Claims, 7 Drawing Sheets

HYBRID CONNECTION ADMISSION CONTROL USING COMBINED MODEL-BASED AND MEASUREMENT-BASED ESTIMATORS

FIELD OF THE INVENTION

This invention relates to computer networks. In particular, the invention relates to connection admission control.

THE BACKGROUND OF THE INVENTION

The purpose of the connection admission control (CAC) function is to ensure that each admitted connection is allocated a sufficient amount of a network node resource (e.g., buffer, bandwidth) along the connection path to satisfy the connection's quality of service (QoS) requirements. A connection request is rejected if there is an insufficient level of the network resource to guarantee the connection's QoS requirements.

There are six basic service categories: constant bit rate (CBR), real-time variable bit rate (rt-VBR), non-real-time variable bit rate (nrt-VBR), unspecified bit rate (UBR), available bit rate (ABR), and guaranteed frame rate (GFR). A different service category has different traffic characteristics and QoS requirements and therefore requires a different treatment by the network. For example, for real-time traffic such as CBR and rt-VBR, the bandwidth should be allocated such that burst level congestion is virtually eliminated and stringent cell transfer delay (CTD) and cell delay variation (CDV) requirements can be satisfied.

Traditional techniques for CAC use fixed models of traffic profiles. The disadvantages include inflexibility, resource under-utilization, and unrealistic admission control.

SUMMARY OF THE INVENTION

A method and apparatus are described for controlling connection admission for a connection request in a network. A first estimator estimates an equivalent cell rate (ECR) based on description of the connection request. The description includes a booking factor. A second estimator estimates a measured utilization factor for admitted connections in the network using measurements of data streams arriving at queues. A controller is coupled to the first and second estimators to generate an admission decision for the connection request based on the estimated ECR and the estimated measured utilization factor.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

RELATED APPLICATIONS

The patent application titled "ESTIMATING EQUIVALENT BANDWIDTH CAPACITY FOR A NETWORK TRANSPORT DEVICE USING ON-LINE MEASUREMENTS" by Man Yip, Madhav Marathe, and David Hughes, filed on Feb. 2, 2000, having Ser. No. 09/496,520. now U.S. Pat. No. 6,891,798, assigned to the same assignee of this patent application, is hereby incorporated by reference in its entirety.

DETAILED DESCRIPTION

A method and apparatus are described for controlling connection admission for a connection request in a network. A first estimator estimates an equivalent cell rate (ECR) based on a description of the connection request. The description includes a booking factor. A second estimator estimates a measured utilization factor for admitted connections in the network using measurements of data streams arriving at queues. A controller is coupled to the first and second estimators to generate an admission decision for the connection request based on the estimated ECR and the estimated measured utilization factor.

In one embodiment, the description of the connection request further includes a connection descriptor and a quality of service (QoS) descriptor. The first estimator includes a scale factor generator and a scaler. The scale factor generator provides a scale factor. The scale factor generator includes a look-up table having entries computed for the QoS descriptor. The entries are indexed by the connection descriptor. The scaler scales the cell rate corresponding to the QoS using the scale factor. The scaled cell rate corresponds to the estimated ECR. The second estimator includes a capacity estimator and a measured utilization factor generator. The capacity estimator estimates a minimum resource needed for the admitted connections meeting quality of service (QoS) requirements within a measurement window. The measured utilization factor generator generates the measured utilization factor using the estimated minimum resource and measurement parameters. The measurement parameters include ECR's of the admitted connections, booking factors of the admitted connections, an upper change limit, and a lower change limit. The controller includes an addition request processor to provide the admission decision based on a request resource and a resource allocation rule. The request resource is calculated based on the ECR and the booking factor. The admission decision is an acceptance of the connection request if the request resource satisfies the resource allocation rule.

The advantages of the invention include accurate estimation of resource utilization, realistic connection admission control for a connection request, and maintaining high performance to accommodate a variety of QoS classes.

In the following, the description refers to the ATM model and the PCI bus as an interface example. It is contemplated that the technique is applicable to other models, buses, or network architectures with similar characteristics.

Figure 1A:
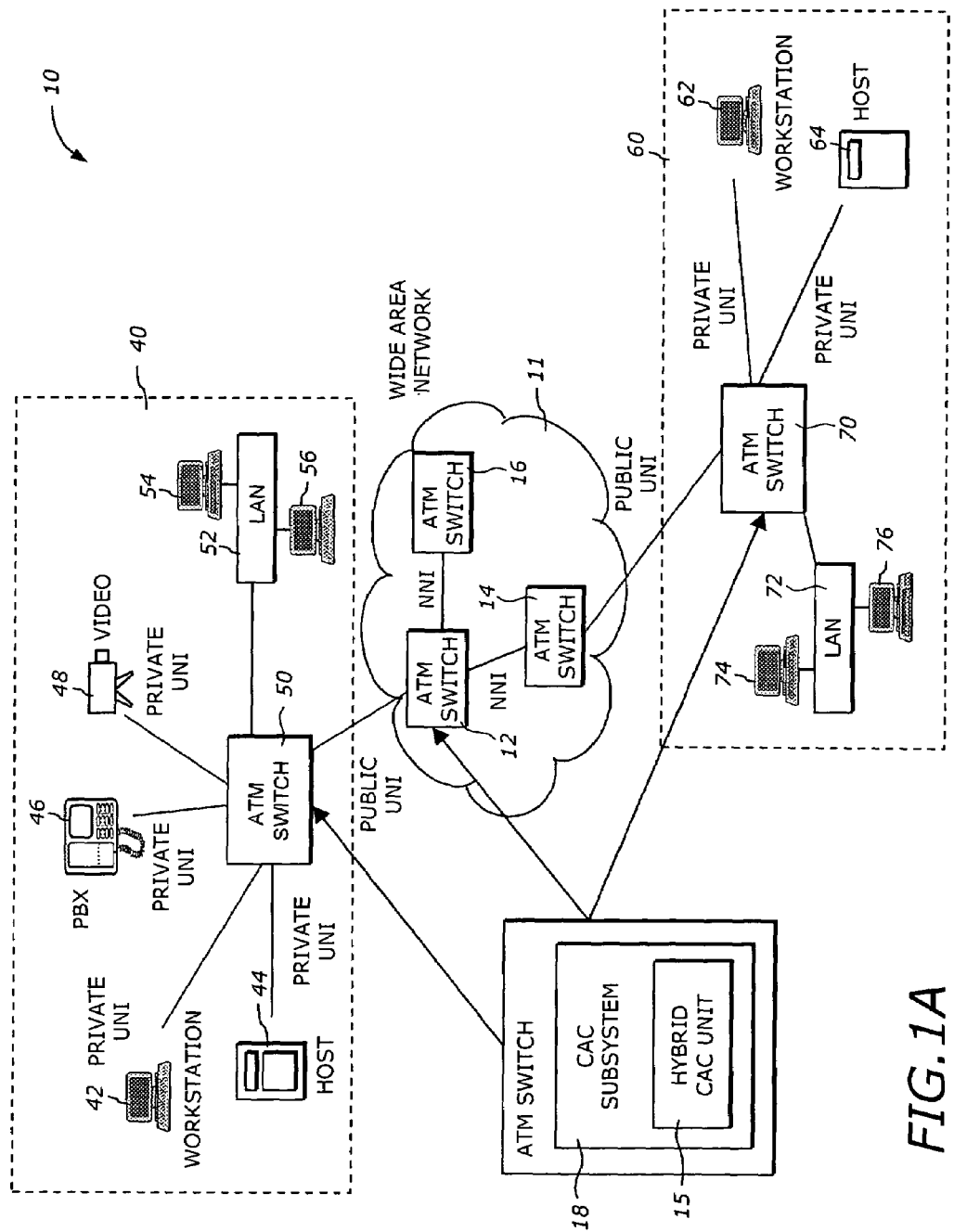
FIG. 1A shows a network system in which one embodiment of the invention can be practiced.

FIG. 1A shows a network system 10 in which one embodiment of the invention can be practiced. The network system 10 includes a wide area network (WAN) 11, subnetworks 40 and 60. In the network system 10, there may be a number of local area networks (LANs), such as those included in the subnetworks 40 and 60.

Subnetworks 40 and 60 are coupled to the WAN 11 via public user network interface (UNI) links to exchange messages via ATM switches or nodes. The WAN 11 includes ATM switches 12, 14, and 16. The ATM switches 12, 14, and 16 are linked by network-network interface (NNI) links. The NNI links may be private NNI (PNNI). In particular, the ATM switch 12 and the ATM switch 14 are linked by an NNI link configured to estimate and/or control capacity of a transport device. A transport device may include a port, a trunk, or a switching fabric.

The subnetwork 40 includes an ATM switch 50, a workstation 42, a host machine 44, a PBX system 46, a video system 48, a local area network (LAN) 52, computers 54 and 56. The computers 54 and 56 are connected to the LAN 52. The workstation 42, the host machine 44, the PBX 46, the video system 48, and the LAN 52 are linked to the ATM switch 50 by private user-network interface (UNI) links. In particular, the ATM switch 50 is configured to have a hybrid connection admission control functionality.

Similarly, the subnetwork 60 includes an ATM switch 70, a workstation 62, a host machine 64, a local area network (LAN) 72, and computers 74 and 76. The computers 74 and 76 are connected to the LAN 72. The workstation 62, the host machine 64, and the LAN 72 are linked to the ATM switch 70 by private user-network interface (UNI) links. In particular, the ATM switch 70 is configured to have a hybrid connection admission control functionality.

The topology shown in FIG. 1A is for illustrative purposes only. Other network topologies and/or configurations are possible. Each of the ATM switches 12, 14, 50, and 70 is configured to have a connection admission control subsystem 18 which includes a hybrid CAC unit 15. The hybrid CAC unit 15 controls the connection admission using combined model-based and measurement-based estimators. In one embodiment, the hybrid CAC unit 15 is implemented in a computer system.

Figure 1B:
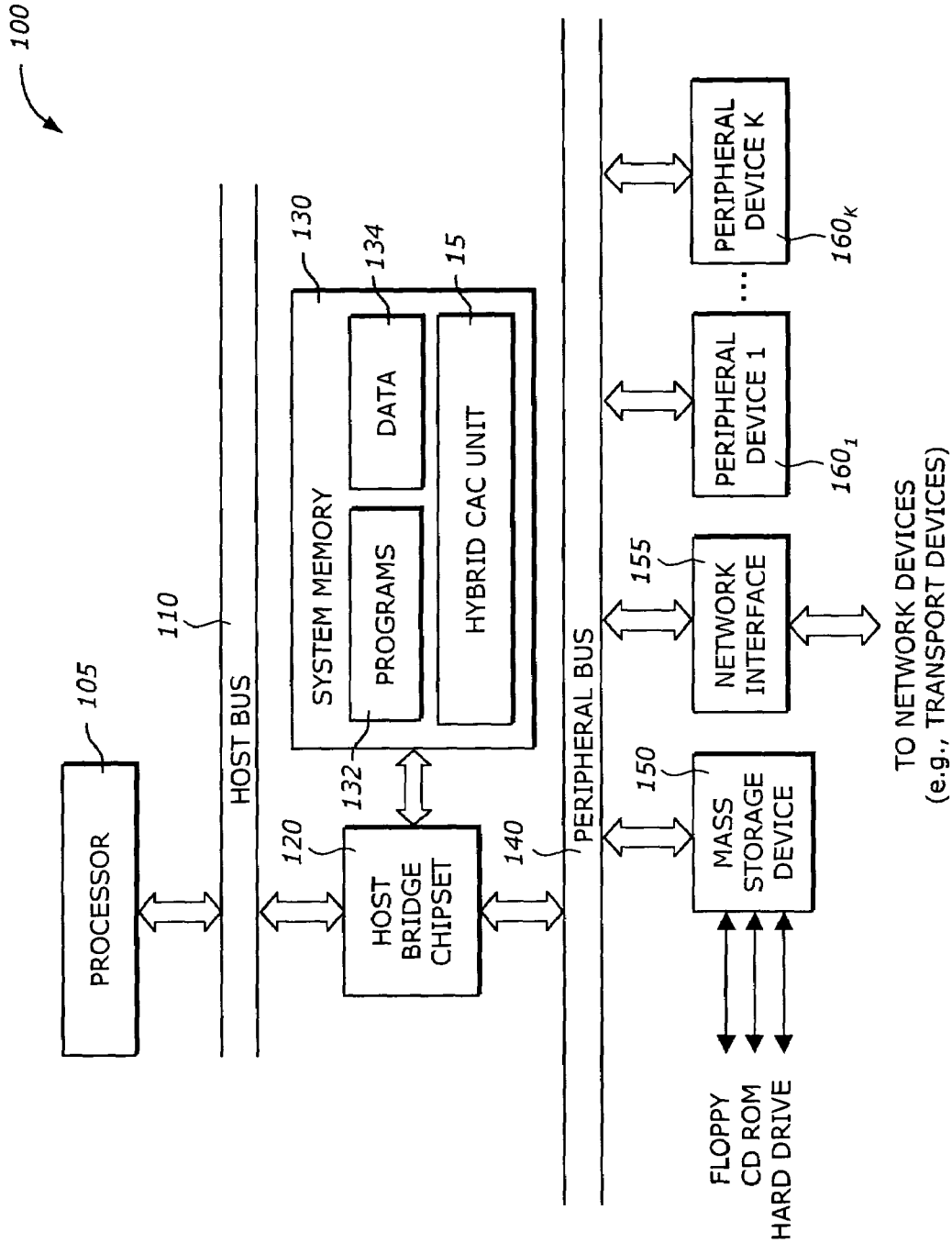
FIG. 1B shows a computer system in which one embodiment of the invention can be practiced.

FIG. 1B shows a computer system 100 in which one embodiment of the invention can be practiced. The computer system 100 may be used as part of an ATM switch, a host machine, a workstation, a LAN, and any other system or subsystem connected to the network. The computer system 100 include a processor 105, a host bus 110, a host bridge chipset 120, a system memory 130, a peripheral bus 140, a mass storage device 150, a network interface device 155, and K peripheral devices $160_1$ to $160_K$.

The processor 105 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 120 includes a number of interface circuits to allow the host processor 105 access to the system memory 130 and the peripheral bus 140. The host bridge chipset 120 may include a memory controller, a bus interface circuit, and an I/O controller. The memory controller provides an interface to the system memory 130. The I/O controller provides control of I/O functions.

The system memory 130 represents one or more mechanisms for storing information. For example, the system memory 130 may include non-volatile or volatile memories. Examples of these memories include flash memory, read only memory (ROM), or random access memory (RAM). The system memory 130 contains a program 132, a data storage 134, and the hybrid CAC unit 15 as shown in FIG. 1A. Of course, the system memory 130 preferably contains additional software (not shown), which is not necessary to understanding the invention.

The peripheral bus 160 provides bus interface to the mass storage device 150, the network interface 155, and the peripheral devices $160_1$ to $160_K$. In one embodiment, the peripheral bus 160 is the peripheral component interconnect (PCI) bus.

The mass storage device 150 include CD ROM, floppy diskettes, and hard drives. The mass storage device 150 stores non-volatile information such as programs or data. The mass storage device 150 provides a mechanism to read machine-readable media. When implemented in software, the elements of the present invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The network interface device 155 provides interface to a network such as ATM, LAN, WAN, etc., or other network devices such as a transport device, e.g., a port, trunk, or switch fabric. In one embodiment, the network interface 155 includes a buffer queue to receive a traffic data stream and a capacity adjuster to adjust the capacity of a transport device. The traffic data stream may enter or exit the network switch as implemented by the computer system 100. The peripheral devices $160_1$ to $160_K$ may include an audio device, a multimedia device, a modem, a printer controller, etc.

Figure 2:
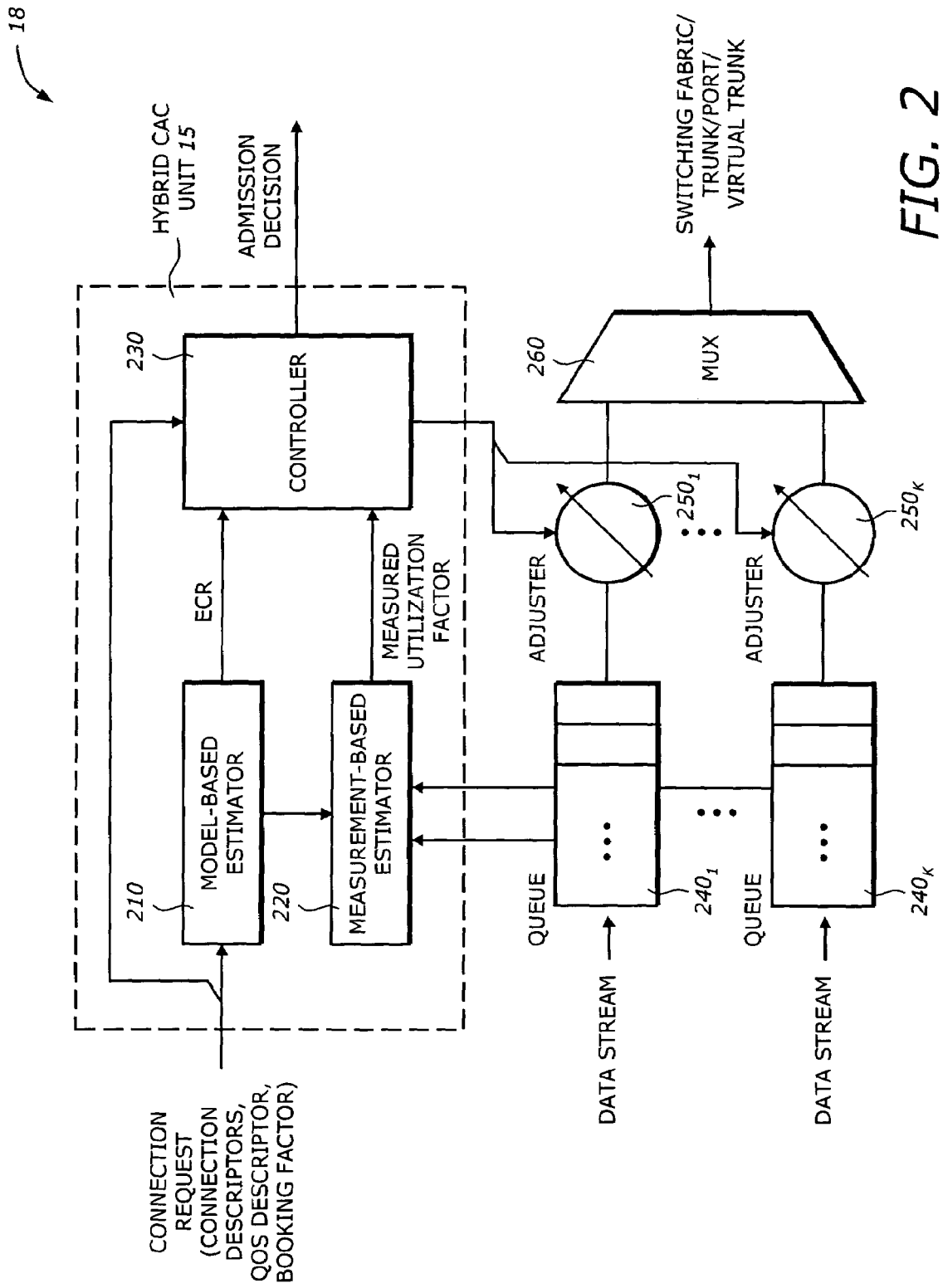
FIG. 2 shows a connection admission control subsystem according to one embodiment of the invention.

FIG. 2 shows a connection admission control (CAC) subsystem 18 according to one embodiment of the invention. The CAC subsystem 18 includes the hybrid CAC unit 15, K buffer queues $240_1$ to $240_K$, K resource adjusters $250_1$ to $250_K$, and a multiplexer 260.

The hybrid CAC unit 15 receives a connection request and generates an admission decision on whether the request is accepted or rejected. The connection request includes information about the connection such as connection descriptors, QoS descriptor, and a booking factor. The connection descriptor includes at least one of a cell rate, a transport device speed, a queue depth, a cell loss ratio, and a link capacity. The transport device speed includes the port or trunk speed. The cell rate includes a peak cell rate (PCR), a sustained cell rate (SCR), a maximum burst size (MBS), and a minimum cell rate (MCR). The QoS descriptor includes a constant bit rate (CBR), a real-time variable bit rate (rt-VBR), a non-real-time variable bit rate (nrt-VBR), an unspecified bit rate (UBR), an available bit rate (ABR), and a guaranteed frame rate (GFR).

The queues $240_1$ to $240_K$ receive data streams from the network traffic. The resource adjusters $250_1$ to $250_K$ are coupled to the respective queues $240_1$ to $240_K$ to provide adjustment commands based on the control of the controller 230 in the hybrid CAC unit 15. The multiplexer 260 multiplexes outputs of all queues and send them to the switching fabric or outgoing physical interface (e.g., trunk/port).

The hybrid CSC unit 15 includes a model-based estimator 210, a measurement-based estimator 220, and a controller 230. The model-based estimator 210 estimates an equivalent cell rate (ECR) based on the description of the connection request which includes the booking factor. The measurement-based estimator 220 estimates a measured utilization factor for the admitted connections in the network using measurements of data streams arriving at queues $240_1$ to $240_K$. The controller 230 receives the booking factor, the estimated ECR, and the measured utilization factor to generate the admission decision. The admission decision is either an acceptance or a rejection for the connection request.

Figure 3:
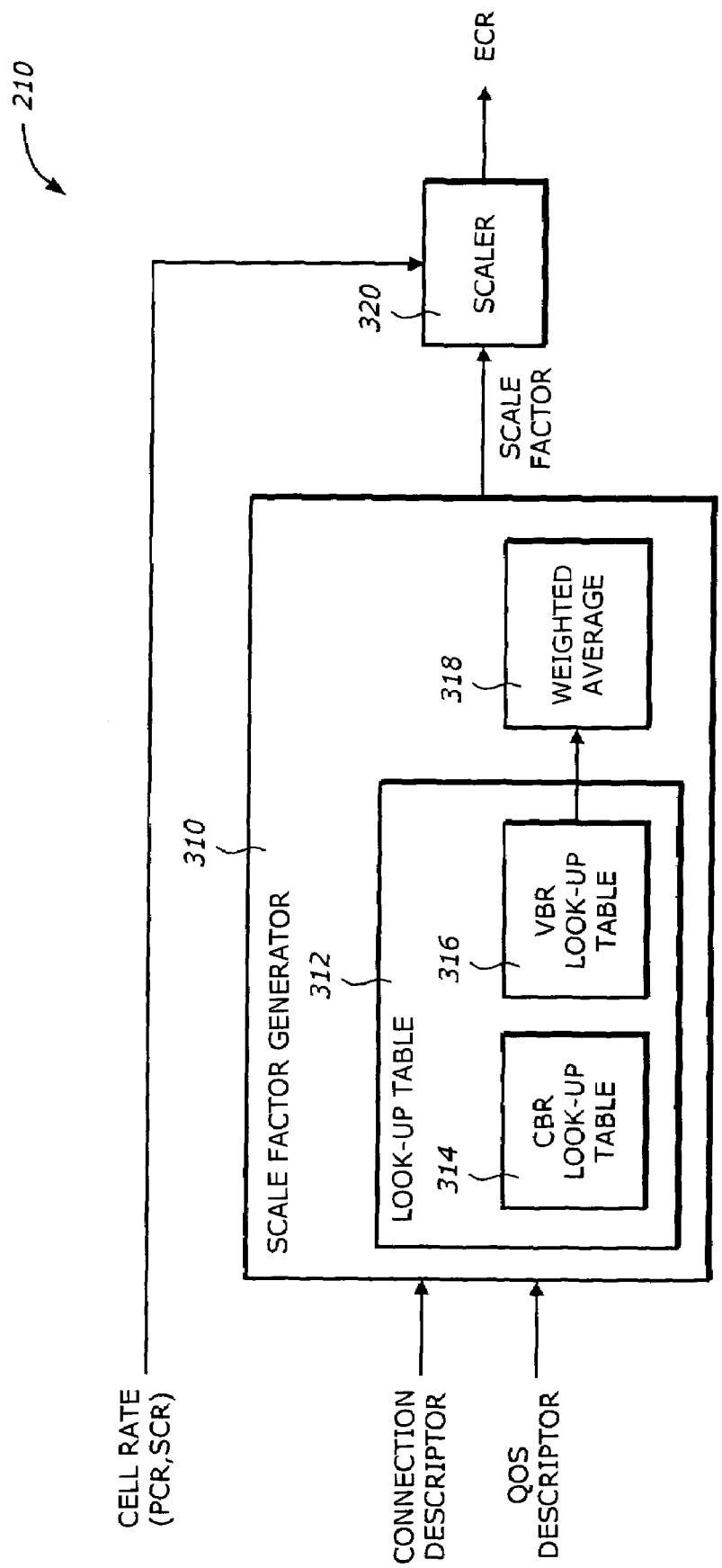
FIG. 3 shows a model-based estimator.

FIG. 3 shows a model-based estimator 210. The model-based estimator 210 includes a scale factor generator 310 and a scaler 320. The model-based estimator 210 receives the connection descriptors, the QoS descriptor, and the cell rate and generates the ECR. The model-based estimator 210 may interface to an external subsystem or processor to receive updated look-up tables as described in the following.

The scale factor generator 310 provides a scale factor. The scale factor generator 310 includes a look-up table 312 and a weighted averager 318. The look-up table 310 has entries computed for the QoS descriptor. The entries are indexed by the connection descriptor. The look-up table 312 includes a CBR look-up table 314 and a VBR look-up table 316. The CBR and VBR look-up tables 314 and 316 can be generated on-line or off-line. An external subsystem or processor can download the CBR and VBR look-up tables 314 and 316 into the model-based estimator 210. This feature allows the user to update or modify the CBR and VBE look-up tables 314 and 316 anytime and provides flexibility in configuring the CAC bandwidth reservation strategy. The CBR look-up table 314 corresponds to the CBR QoS and the VBR look-up table 316 corresponds to the VBR. In particular, for ABR, UBR, and GFR connections, the ECR is equal to the MCR.

The CBR look-up table 314 is indexed by a cell rate parameter P and the transport device speed C. The cell rate parameter P is within a range from unity to the maximum speed supported by the transport device. The scale factor generated by the CBR look-up table 314 is one of the entries indexed by the cell rate parameter P and the transport device speed C.

The VBR look-up table 316 is indexed by a row index and a column index. The row index is a ratio between the queue depth and the MBS. The column index is a ratio between the link capacity and the PCR. The scale factor is one of the entries indexed by the row and column indices. When there is no exact match for either the row index, or the column index, or both, the nearest entries to the row and column indices are interpolated to provide the scale factor. The interpolation is done by using the weighted averager 318. The weighted averaging is performed using the following procedure.

Let the VBR look-up table be a two dimensional array $V(x,y)$ where x and y are the row and column indices, respectively. Let min{ } be a minimum operator which takes the minimum of the arguments.

1) If both row and column indices x and y are not matched.

Select three nearest entries $V(x1, y1)$, $V(x1, y2)$, and $V(x2, y1)$ where $x1 < x < x2$ and $y1 \leq y \leq y2$. The scale factor is determined by:

$$\text{scale factor} = \min\{W1[V(x1,y1),V(x1,y2)], W2[V(x1,y1), V(x2,y1)]\} \quad (1)$$

where:

$$W1[V(x1,y1),V(x1,y2)] = \{V(x1,y1)*(y2-y) + V(x1,y2)*(y-y1)\}/(y2-y1) \quad (2)$$

and $$W2[V(x1,y1),V(x2,y1)] = \{V(x1,y1)*(x2-x) + V(x2,y1)*(x-x1)\}/(x2-x1) \quad (3)$$

2) If row index is matched but column index is not matched.

Select two nearest entries $V(x, y1)$ and $V(x, y2)$ where $y1 \leq y \leq y2$. The =scale factor is determined by:

$$\text{scale factor} = W[V(x,y1), V(x,y2)] \quad (4)$$

where $$W[V(x,y1),V(x,y2)] = \{V(x,y1)*(y2-y) + V(x,y2)*(y-y1)\}/(y2-y1) \quad (5)$$

3) If column index match but row index is not matched.

Select two nearest entries $V(x1, y)$ and $V(x2, y)$ where $x1 \leq x \leq x2$. The scale factor is determined by:

$$\text{scale factor} = W[V(x1,y), V(x2,y)] \quad (6)$$

where $$W[V(x1,y),V(x2,y)] = \{V(x1,y)*(x2-x) + V(x2,y)*(x-x1)\}/(x2-x1) \quad (7)$$

Figure 4A:
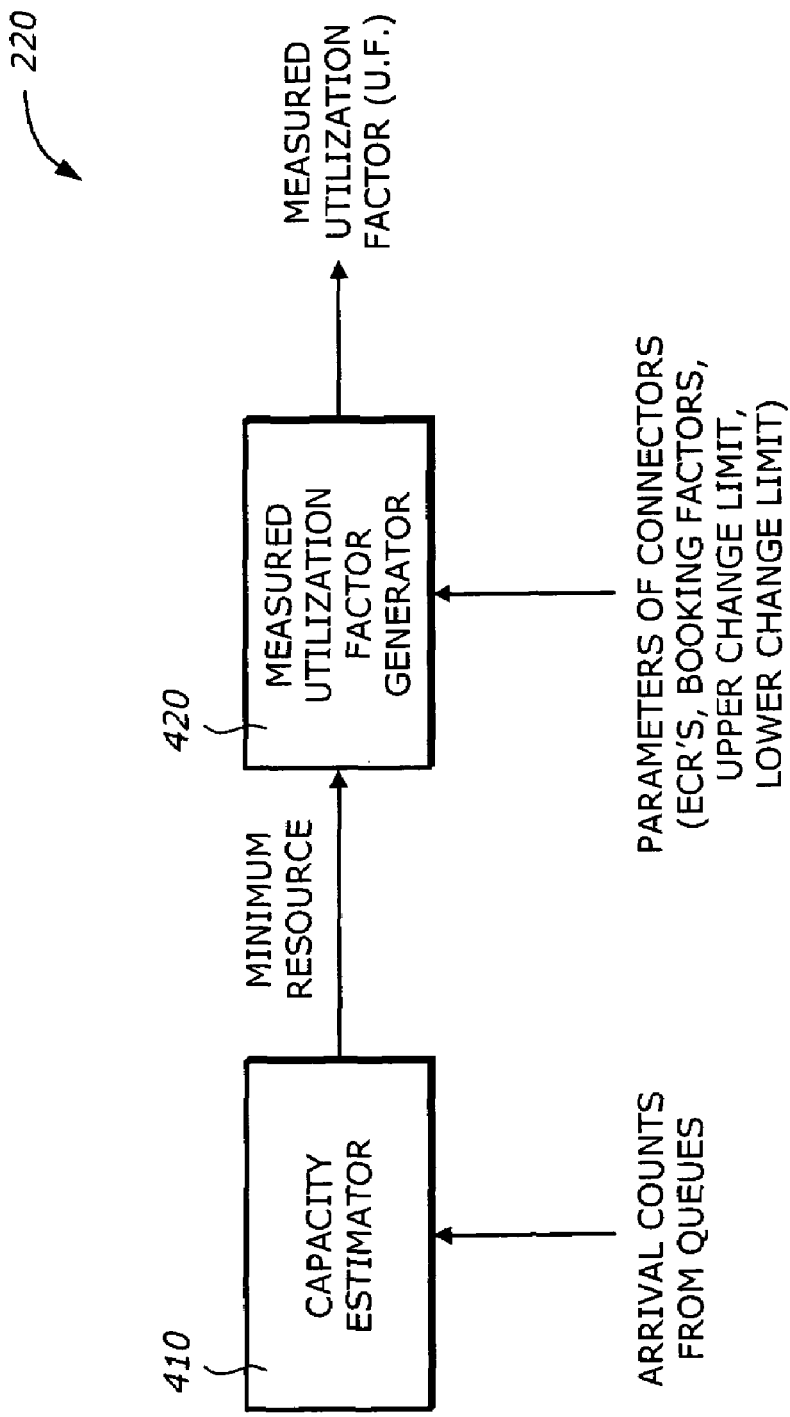
FIG. 4A shows a measurement-based estimator.

FIG. 4A shows a measurement-based estimator 220. The measurement-based estimator 220 includes a capacity estimator 410 and a measured utilization factor generator 420. The measurement-based estimator 220 measures and monitors the statistics of the data streams arriving at the queues 2401 to 240K (FIG. 2). The data are collected and processed on a periodic basis. Every period is a measurement window.

The capacity estimator 410 estimates a minimum resource needed for the admitted connections meeting quality of service (QoS) target requirements within the measurement window. The minimum resource is the minimum amount of bandwidth resource needed to attain a pre-defined QoS target for data streams passing through a queuing subsystem within the network switch. The minimum resource can be referred to as minimum bandwidth guarantee for a specified QoS. The QoS target requirements include the cell loss ratio (CLR) and the cell delay variation (CDV). In one embodiment, the capacity estimator 410 uses a procedure described in the co-pending application titled "ESTIMATING EQUIVALENT BANDWIDTH CAPACITY FOR A NETWORK TRANSPORT DEVICE USING ON-LINE MEASUREMENTS". Alternatively, the capacity estimator 410 can use a procedure supplied by other vendors.

The measured utilization factor generator 410 generates the measured utilization factor using the estimated minimum resource from the capacity estimator 410 and measurement parameters of the connections in the system. The measurement parameters include the ECR's of the admitted connections, the booking factors of the admitted connections, an upper change limit U, and a lower change limit L.

Figure 4B:
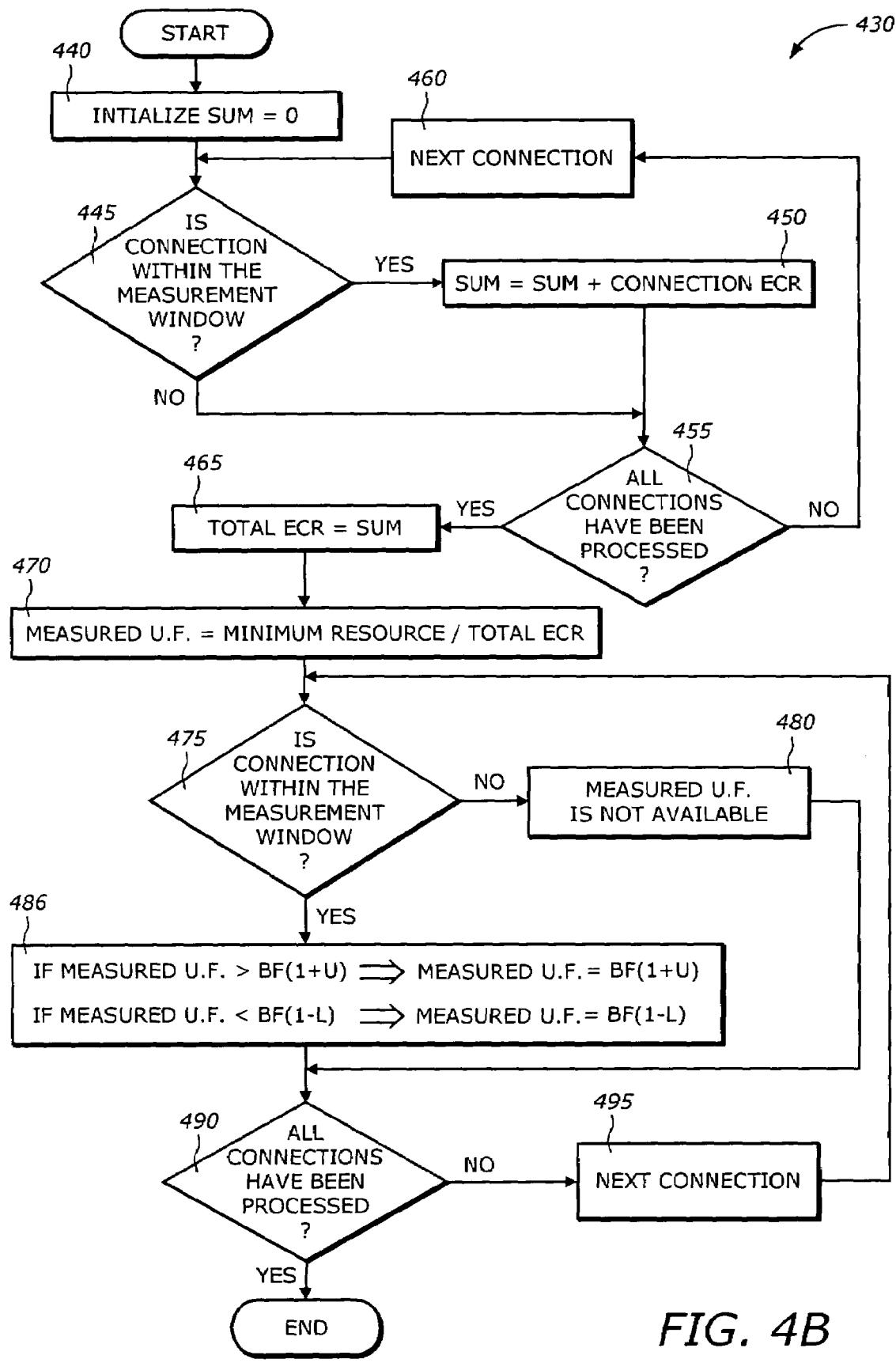
FIG. 4B shows a flowchart for a process to generate the measured utilization factor.

FIG. 4B shows a flowchart for a process 430 to generate the measured utilization factor.

Upon START, the process 430 initializes a sum variable to zero (Block 440). Then the process 430 determines if the connection is within the measurement window, i.e., the connection stays within the system during the entire measurement period (Block 445). If not, the process 430 proceeds to Block 455. If the connection is within the measurement window, the process 430 adds the connection ECR to the sum (Block 450). Then the process 430 determines if all connections have been processed (Block 455). If not, the process 430 examines the next connection (Block 460) and returns to block 445. If all connections have been processed, the process 430 assigns the sum to the total ECR (Block 465). Then, the process 430 computes the measured utilization factor by dividing the estimated minimum resource from the capacity estimator 410 (FIG. 4A) by the total ECR (Block 470)

Next, the process 430 starts examining the connections again. The process 430 determines if the connection is within the measurement window (Block 475). If not, the process 430 marks the measured utilization factor is not available (Block 480) and proceeds to block 490. If the connection is within the measurement window, the process 430 adjusts the computed measured utilization factor (Block 485) based on the booking factor (BF) and the upper change limit U, and the lower change limit L as follows:

If the measured utilization factor is greater than BF*(1+U), then the measured utilization factor is adjusted to BF*(1+U). If the measured utilization factor is less than BF*(1−L), then the measured utilization factor is adjusted to BF*(1−L).

Next, the process 430 determines if all connections have been processed (Block 490). If so, the process 430 is terminated. Otherwise, the process 430 examines the next connection (Block 495) and returns back to block 470.

Figure 5:
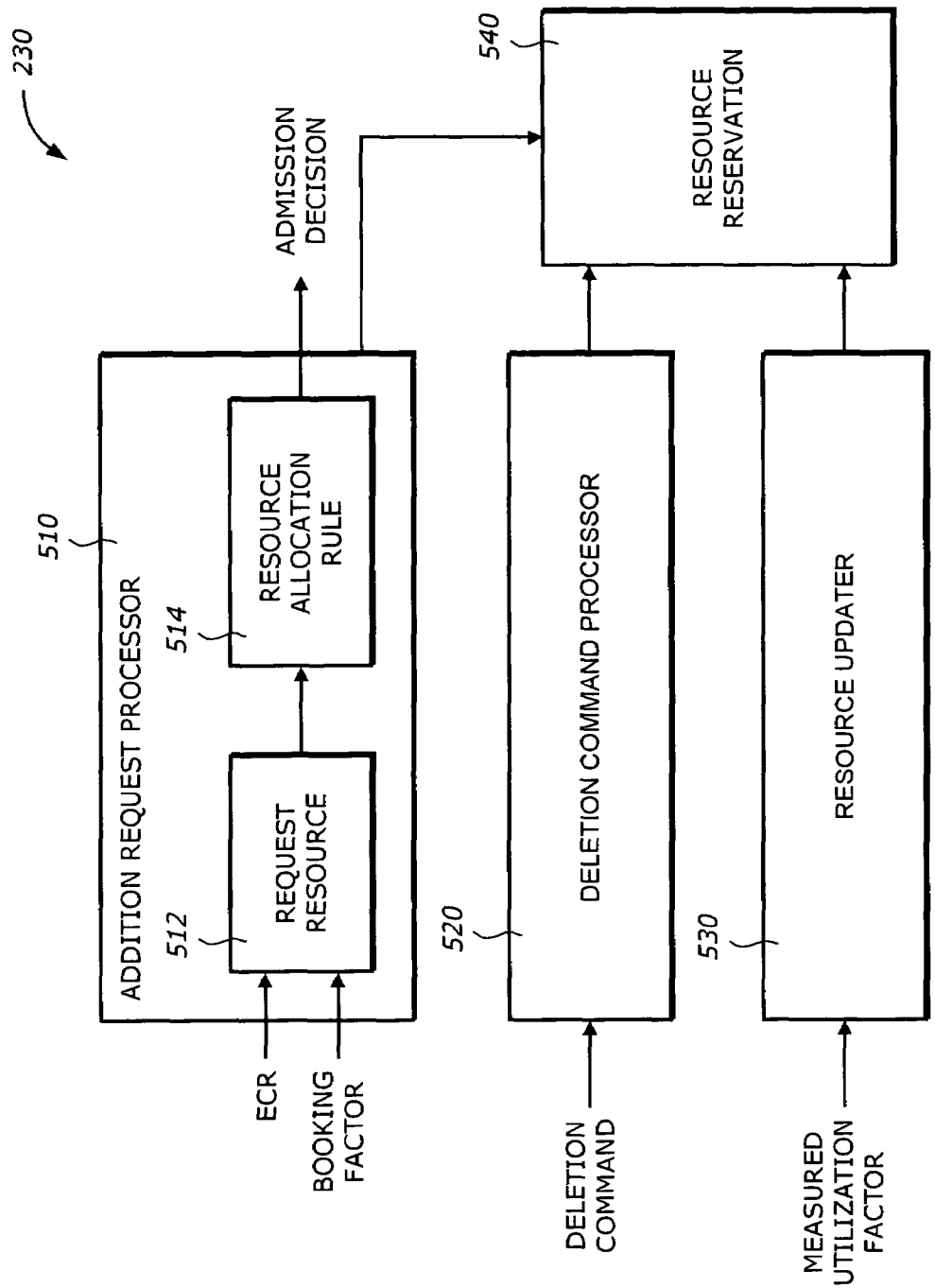
FIG. 5 shows a controller.

FIG. 5 shows a controller 230. The controller 230 includes an addition request processor 510, a connection deletion command processor 520, and a resource updater 530.

The addition request processor 510 receives the ECR from the model-based estimator 210 (FIG. 2) and the booking factor (BF) from the connection descriptor. The addition request processor 510 includes a request resource 512 and a resource allocation rule 514. The resource allocation rule 514 will be described later. The addition request processor 510 generates the admission decision based on the request resource 512 and the resource allocation rule 514. The addition request processor 510 calculates the request resource 512 as follows:

$$\text{Request resource} = ECR * BF \tag{8}$$

The addition request processor 510 checks if the system has enough resource (e.g., bandwidth) to accept the connection addition request according to the resource allocation rule 514. The admission decision is an acceptance if the request resource satisfies the resource allocation rule 514. The resource is reserved if the request is accepted.

The deletion command processor 520 adjusts a resource reservation 540 of a subsystem of a removed connection. When a delete connection command is received, the deletion command processor 520 removes the deleted connection from the selected queue subsystem and reduces the resource reservation 540 of that subsystem according to the following rule:

If the measured utilization factor is not available, then reduce the reservation 540 by ECR*BF. Otherwise, reduce the reservation 540 by ECR* measured utilization factor.

The resource updater 530 updates a resource reservation 540 of a subsystem using the ECR, the booking factor, and the measured utilization factor using the following procedure:

for every queuing subsystem
initialize X to zero
for every connection
    if measured utilization factor is not available, then
        X=X+ECR*BF
    else X=X+ECR*measured utilization factor
end connection loop.
new resource reservation of the queuing subsystem is X.
end queuing subsystem loop.

Resource Allocation Rule:

A request is accepted if it satisfies the resource allocation rule 514. The resource allocation rule 514 is an instance of a number of rules applied at the time of configuration, reconfiguration, or when a connection is to be added. The allocation of resources is based on a hierarchical resource organization. A typical hierarchical resource organization includes a capacity (C), a service group ($SG_i$), a partition ($PART_{i,j}$), a CoS buffer ($CoSB_{i,k}$), a $CoS_a$, and a connection ($X_{a,m}$).

The capacity C is the resource capacity of an interface. The capacity C may have many service groups. The $SG_i$ is one instance of a service group. The $SG_i$ may have many CoSB's and partitions. The $PART_{i,j}$ is the j-th instance of the partition and the $CoSB_{i,k}$ is the k-th instance of the CosB. Each partition can support multiple CoS's. The $CoS_a$ is the a-th instance of the CoS. Each CoSB can support one or more CoS's. Each CoS may have multiple connections. The connection $X_{a,m}$ is the m-th instance of the connection.

When the SG in an interface having the capacity C is configured, it is checked if the combined capacity of all the SG's in that interface does not exceed the interface capacity. Similarly, when a partition or a CoSB is configured, it is checked if the combined capacity of all the partitions or the CoSB's does not exceed the corresponding SG's capacity.

A partition typically requires guaranteed bandwidth allocated for each of its CoS's. A logical interface is allowed to have multiple partitions to be configured. In this case, more than one partition may share the same CoSB for a particular CoS. Therefore, the CAC mechanism is to verify the CoS minimum and maximum requirements against both the partition and CoSB minimum and maximum requirements.

The basic principle for resource allocation is based on resource sharing. Any resource that is available for sharing is put in a shared pool. Initially, all the resources are in the shared pool. Each of the participating members of that pool is guaranteed the minimum amount that it asks for (after validation) and can use up to the maximum amount. When a member of that pool asks for the minimum resource, the guaranteed minimum is taken from the shared pool and given to that member.

When a new member or entity is configured, the new partition configuration is accepted if the sum of all the minimum amounts of all the members including the new member is less than the pooled resource, even though the available resource is not enough of the new member. In this case, the new member is marked as having deficit in resource and the resource that is available at that time is given to that new member. The rest of the needed resource will be given to that new member as soon as the resource is freed up by other members.

A resource allocation rule (e.g., the resource allocation rule 514 in FIG. 5) ensures that resource is appropriately allocated. The resource allocation rule can be applied at the time of configuration/re-configuration, or when a connection is added. Some examples of the resource allocation rule 514 are stated in the following.

At time of configuration/reconfiguration:

Rule 1: The sum of the minimum required resource of all CoS's in $PART_{i,j}$ may not exceed the $PART_{i,j}^{min}$. This rule is applied for all partitions in the corresponding service group $SG_i$.

Rule 2: The sum of the minimum required resource of all CoS's in $CoSB_{i,k}$ may not exceed the $CoSB_{i,k}^{min}$. This rule is applied for all CoSB's in the corresponding service group $SG_i$.

Rule 3: The sum of the minimum required resource of all partitions in a $SG_i$ may not exceed the $SG_i^{min}$.

Rule 4: The sum of the minimum resource of all CoSB's in a $SG_i$ may not exceed the $SG_i^{min}$.

Rule 5: The sum of the minimum resource of all service groups may not exceed the link capacity C.

When a connection is added:

Rule 1: $CoS_a^{\beta,new} \leq CoS_a^{max}$ (9)

where: $CoS_a^{\beta,new} = CoS_a^\beta + X_{a,m}$ (10)

Rule 2: $PART_{i,j}^{\beta,new} \leq PART_{i,j}^{max}$ (11)

where:

$PART_{i,j}^{\beta,new} = \Sigma \max(CoS_b^\beta, CoS_b^{min}) + \max(CoS_a^{\beta,new}, CoS_a^{min})$ (12)

and the summation is done for "b" from 1 to max CoS in $PART_{i,j}$ except for $CoS_a$.

Rule 3: $CoSB_{i,k}^{\beta,new} \leq CoSB_{i,k}^{max}$ (13)

where:

$CoSB_{i,k}^{\beta,new} = \Sigma \max(CoS_b^\beta, CoS_b^{min}) + \max(CoS_a^{\beta,new}, CoS_a^{min})$ (14)

and the summation is done for "b" from 1 to max CoS in $CoSB_{i,k}$ except for $CoS_a$.

Rule 4: $SG_i^{\beta,new} \leq SG_i^{max}$ (15)

where:

$SG_i^{\beta,new} = \max[SG_i^{min}, U, V]$ (16)

and $U = \Sigma CoSB_{i,k}^\beta + CoSB_{i,k}^{\beta,new}$ (17)

and the summation is done for k=1 to max CoSB's and k≠new.

$V = \Sigma PART_{i,j}^\beta + PART_{i,j}^{\beta,new}$ (18)

and the summation is done for j=1 to max partitions and j≠new.

Rule 5: $\Sigma SG_i^\beta + SG_i^{\beta,new} \cdot C$ (19)

and the summation is done for i=1 to max SG's and i≠new.

A technique has been described to control connection admission for a connection request in a network. A first estimator estimates an equivalent cell rate (ECR) based on description of the connection request. The description includes a booking factor. A second estimator estimates a measured utilization factor for admitted connections in the network using measurements of data streams arriving at queues. A controller is coupled to the first and second estimators to generate an admission decision for the connection request based on the estimated ECR and the estimated measured utilization factor.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus to control connection admission for a connection request in a network, the apparatus comprising:
    a first estimator to estimate an equivalent cell rate (ECR) based on description of the connection request, the description including a booking factor;
    a second estimator to estimate a measured utilization factor for admitted connections in the network using measurements of data streams arriving at queues and the booking factor; and
    a processor-based controller coupled to the first and second estimators to generate an admission decision for the connection request comprising:
        an addition request processor to generate the admission decision based on a request resource equal to a product of the ECR and the booking factor, and
        a resource allocation rule using a hierarchical resource organization, and a resource updater to update a resource reservation using the ECR, the booking factor, and the estimated measured utilization factor.

2. The apparatus of claim 1 wherein the description of the connection request further includes a connection descriptor and a quality of service (QoS) descriptor.

3. The apparatus of claim 2 wherein the connection descriptor includes at least one of a cell rate, a transport device speed, a queue depth, a cell loss ratio, and a link capacity.

4. The apparatus of claim 3 wherein the cell rate is one of a peak cell rate (PCR), a sustained cell rate (SCR), a maximum burst size (MBS), and a minimum cell rate (MCR).

5. The apparatus of claim 4 wherein the QoS descriptor is one of a constant bit rate (CBR), a real-time variable bit rate (rt-VBR), a non-real-time variable bit rate (nrt-VBR), an unspecified bit rate (UBR), an available bit rate (ABR), and a guaranteed frame rate (GFR).

6. The apparatus of claim 5 wherein the first estimator comprises:
    a scale factor generator to provide a scale factor, the scale factor generator comprising a look-up table having entries computed for the QoS descriptor, the entries being indexed by the connection descriptor; and
    a scaler coupled to the scale factor generator to scale the cell rate corresponding to the QoS using the scale factor, the scaled cell rate corresponding to the estimated ECR.

7. The apparatus of claim 6 wherein the look-up table is one of a CBR look-up table and a VBR look-up table, the CBR look-up table corresponding to the CBR, the VBR look-up table corresponding to the VBR.

8. The apparatus of claim 7 wherein the CBR look-up table is indexed by a cell rate parameter and the transport device speed, the cell rate parameter being within a range from unity to the PCR.

9. The apparatus of claim 8 wherein the scale factor is one of the entries indexed by the cell rate parameter and the transport device speed.

10. The apparatus of claim 7 wherein the VBR look-up table is indexed by a first ratio between the queue depth and the MBS and a second ratio between the link capacity and the PCR.

11. The apparatus of claim 10 wherein the scale factor is a weighted value from entries nearest to an entry corresponding to the first and second ratios when there is no exact match with at least one of the first and second ratios.

12. The apparatus of claim 1 wherein the second estimator comprises:
    a capacity estimator to estimate a minimum resource needed for the admitted connections meeting quality of service (QoS) requirements within a measurement window; and
    a measured utilization factor generator coupled to the capacity estimator to generate the measured utilization factor using the estimated minimum resource and measurement parameters.

13. A method to control connection admission for a connection request in a network, the method comprising:

estimating an equivalent cell rate (ECR) based on description of the connection request, the description including a booking factor;

estimating a measured utilization factor for admitted connections in the network using measurements of data streams arriving at queues and the booking factor; and using one or more processors, generating an admission decision for the connection request comprising:
generating the admission decision based on a request resource equal to a product of the ECR and the booking factor, and a resource allocation rule using a hierarchical resource organization, and
updating a resource reservation using the ECR, the booking factor, and the estimated measured utilization factor.

14. The method of claim 13 wherein the description of the connection request further includes a connection descriptor and a quality of service (QoS) descriptor.

15. The method of claim 14 wherein the connection descriptor includes at least one of a cell rate, a transport device speed, a queue depth, a cell loss ratio, and a link capacity.

16. The method of claim 15 wherein the cell rate is one of a peak cell rate (PCR), a sustained cell rate (SCR), a maximum burst size (MBS), and a minimum cell rate (MCR).

17. The method of claim 16 wherein the QoS descriptor is one of a constant bit rate (CBR), a real-time variable bit rate (rt-VBR), a non-real-time variable bit rate (nrt-VBR), an unspecified bit rate (UBR), an available bit rate (ABR), and a guaranteed frame rate (GFR).

18. The method of claim 17 wherein estimating the ECR comprises:
providing a scale factor using a look-up table, the look-up table having entries computed for the QoS descriptor, the entries being indexed by the connection descriptor; and
scaling the cell rate corresponding to the QoS using the scale factor, the scaled cell rate corresponding to the estimated ECR.

19. The method of claim 18 wherein the look-up table is one of a CBR look-up table and a VBR look-up table, the CBR look-up table corresponding to the CBR, the VBR look-up table corresponding to the VBR.

20. The method of claim 19 wherein the CBR look-up table is indexed by a cell rate parameter and the transport device speed, the cell rate parameter being within a range from unity to the PCR.

21. The method of claim 20 wherein the scale factor is one of the entries indexed by the cell rate parameter and the transport device speed.

22. The method of claim 19 wherein the VBR look-up table is indexed by a first ratio between the queue depth and the MBS and a second ratio between the link capacity and the PCR.

23. The method of claim 22 wherein the scale factor is a weighted value from entries nearest to an entry corresponding to the first and second ratios when there is no exact match with at least one of the first and second ratios.

24. The method of claim 13 wherein estimating the measured utilization factor comprises:
estimating a minimum resource needed for the admitted connections meeting quality of service (QoS) requirements within a measurement window by a capacity estimator; and
generating the measured utilization factor using the estimated minimum resource and measurement parameters by a measured utilization factor generator.

25. A computer program product comprising:
a computer usable medium having computer program code embodied therein for controlling connection admission for a connection request in a network, the computer program product having:
computer readable program code for estimating an equivalent cell rate (ECR) based on description of the connection request, the description including a booking factor;
computer readable program code for estimating a measured utilization factor for admitted connections in the network using measurements of data streams arriving at queues and the booking factor; and
computer readable program code for generating an admission decision for the connection request comprising:
computer readable program code for generating the admission decision based on a request resource equal to a product of the ECR and the booking factor, and a resource allocation rule using a hierarchical resource organization, and computer readable program code for updating a resource reservation using the ECR, the booking factor, and the estimated measured utilization factor.

26. The computer program product of claim 25 wherein the description of the connection request further includes a connection descriptor and a quality of service (QoS) descriptor.

27. The computer program product of claim 26 wherein the connection descriptor includes at least one of a cell rate, a transport device speed, a queue depth, a cell loss ratio, and a link capacity.

28. The computer program product of claim 27 wherein the cell rate is one of a peak cell rate (PCR), a sustained cell rate (SCR), a maximum burst size (MBS), and a minimum cell rate (MCR).

29. The computer program product of claim 28 wherein the QoS descriptor is one of a constant bit rate (CBR), a real-time variable bit rate (rt-VBR), a non-real-time variable bit rate (nrt-VBR), an unspecified bit rate (UBR), an available bit rate (ABR), and a guaranteed frame rate (GFR).

30. The computer program product of claim 29 wherein the computer readable program code for estimating the ECR comprises:
computer readable program code for providing a scale factor using a look-up table, the look-up table having entries computed for the QoS descriptor, the entries being indexed by the connection descriptor; and
computer readable program code for scaling the cell rate corresponding to the QoS using the scale factor, the scaled cell rate corresponding to the estimated ECR.

31. The computer program product of claim 30 wherein the look-up table is one of a CBR look-up table and a VBR look-up table, the CBR look-up table corresponding to the CBR, the VBR look-up table corresponding to the VBR.

32. The computer program product of claim 31 wherein the CBR look-up table is indexed by a cell rate parameter and the transport device speed, the cell rate parameter being within a range from unity to the PCR.

33. The computer program product of claim 32 wherein the scale factor is one of the entries indexed by the cell rate parameter and the transport device speed.

34. The computer program product of claim 31 wherein the VBR look-up table is indexed by a first ratio between the queue depth and the MBS and a second ratio between the link capacity and the PCR.

35. The computer program product of claim 34 wherein the scale factor is a weighted value from entries nearest to an entry corresponding to the first and second ratios when there is no exact match with at least one of the first and second ratios.

36. The computer program product of claim 25 wherein the computer readable program code for estimating the measured utilization factor comprises:
computer readable program code for estimating a minimum resource needed for the admitted connections meeting quality of service (QoS) requirements within a measurement window by a capacity estimator; and
computer readable program code for generating the measured utilization factor using the estimated minimum resource and measurement parameters by a measured utilization factor generator.

37. A system interfacing to a network, the system comprising:
a plurality of queues to receive data streams; and
a circuit to control connection admission for a connection request in the network, the circuit comprising;
a first estimator to estimate an equivalent cell rate (ECR) based on description of the connection request, the description including a booking factor;
a second estimator to estimate a measured utilization factor for admitted connections in the network using measurements of the data streams arriving at the queues and the booking factor; and
a controller coupled to the first and second estimators to generate an admission decision for the connection request comprising:
an addition request processor to generate the admission decision based on
a request resource equal to a product of the ECR and the booking factor, and a resource allocation rule using a hierarchical resource organization, and
a resource updater to update a resource reservation using the ECR, the booking factor, and the estimated measured utilization factor.

38. The system of claim 37 wherein the description of the connection request further includes a connection descriptor and a quality of service (QoS) descriptor.

39. The system of claim 38 wherein the connection descriptor includes at least one of a cell rate, a transport device speed, a queue depth, a cell loss ratio, and a link capacity.

40. The system of claim 39 wherein the cell rate is one of a peak cell rate (PCR), a sustained cell rate (SCR), a maximum burst size (MBS), and a minimum cell rate (MCR).

41. The system of claim 40 wherein the QoS descriptor is one of a constant bit rate (CBR), a real-time variable bit rate (rt-VBR), a non-real-time variable bit rate (nrt-VBR), an unspecified bit rate (UBR), an available bit rate (ABR), and a guaranteed frame rate (GFR).

42. The system of claim 41 wherein the first estimator comprises:
a scale factor generator to provide a scale factor, the scale factor generator comprising a look-up table having entries computed for the QoS descriptor, the entries being indexed by the connection descriptor; and
a scaler coupled to the scale factor generator to scale the cell rate corresponding to the QoS using the scale factor, the scaled cell rate corresponding to the estimated ECR.

43. The system of claim 42 wherein the look-up table is one of a CBR look-up table and a VBR look-up table, the CBR look-up table corresponding to the CBR, the VBR look-up table corresponding to the VBR.

44. The system of claim 43 wherein the CBR look-up table is indexed by a cell rate parameter and the transport device speed, the cell rate parameter being within a range from unity to the PCR.

45. The system of claim 44 wherein the scale factor is one of the entries indexed by the cell rate parameter and the transport device speed.

46. The system of claim 43 wherein the VBR look-up table is indexed by a first ratio between the queue depth and the MBS and a second ratio between the link capacity and the PCR.

47. The system of claim 46 wherein the scale factor is a weighted value from entries nearest to an entry corresponding to the first and second ratios when there is no exact match with at least one of the first and second ratios.

48. The system of claim 37 wherein the second estimator comprises:
a capacity estimator to estimate a minimum resource needed for the admitted connections meeting quality of service (QoS) requirements within a measurement window; and
a measured utilization factor generator coupled to the capacity estimator to generate the measured utilization factor using the estimated minimum resource and measurement parameters.

49. An apparatus for controlling connection admission for a connection request in a network, comprising:
means for estimating an equivalent cell rate (ECR) based on description of the connection request, the description including a booking factor;
means for estimating a measured utilization factor for admitted connections in the network using measurements of data streams arriving at queues and the booking factor; and
means for generating, using one or more processors, an admission decision for the connection request comprising:
means for generating the admission decision based on a request resource equal to a product of the ECR and the booking factor and a resource
allocation rule using a hierarchical resource organization, and means for updating a resource reservation using the ECR, the booking factor, and the estimated measured utilization factor.

50. The apparatus of claim 49 wherein the description of the connection request further includes a connection descriptor and a quality of service (QoS) descriptor.

51. The apparatus of claim 50 wherein the connection descriptor includes at least one of a cell rate, a transport device speed, a queue depth, a cell loss ratio, and a link capacity.

52. The apparatus of claim 51 wherein the cell rate is one of a peak cell rate (PCR), a sustained cell rate (SCR), a maximum burst size (MBS), and a minimum cell rate (MCR).

53. The apparatus of claim 52 wherein the QoS descriptor is one of a constant bit rate (CBR), a real-time variable bit rate (rt-VBR), a non-real-time variable bit rate (nrt-VBR), an unspecified bit rate (UBR), an available bit rate (ABR), and a guaranteed frame rate (GFR).

54. The apparatus of claim 53 wherein the means for estimating an ECR comprises:
means for providing a scale factor using a look-up table, the look-up table having entries computed for the QoS descriptor, the entries being indexed by the connection descriptor; and, means for scaling the cell rate corresponding to the QoS using the scale factor, the scaled cell rate corresponding to the estimated ECR.

55. The apparatus of claim 54 wherein the look-up table is one of a CBR look-up table and a VBR look-up table, the CBR look-up table corresponding to the CBR, the VBR look-up table corresponding to the VBR.

56. The apparatus of claim 55 wherein the CBR look-up table is indexed by a cell rate parameter and the transport device speed, the cell rate parameter being within a range from unity to the PCR.

57. The apparatus of claim 56 wherein the scale factor is one of the entries indexed by the cell rate parameter and the transport device speed.

58. The apparatus of claim 55 wherein the VBR look-up table is indexed by a first ratio between the queue depth and the MBS and a second ratio between the link capacity and the PCR.

59. The apparatus of claim 58 wherein the scale factor is a weighted value from entries nearest to an entry corresponding to the first and second ratios when there is no exact match with at least one of the first and second ratios.

60. The apparatus of claim 49 wherein the means for estimating a measured utilization factor comprises:

means for estimating a minimum resource needed for the admitted connections meeting quality of service (QoS) requirements within a measurement window by a capacity estimator; and means for generating the measured utilization factor using the estimated minimum resource and measurement parameters by a measured utilization factor generator.

\* \* \* \* \*